Dec. 2, 1969    J. R. BERRYHILL    3,481,838
METHOD OF WEIGHING
Filed Dec. 9, 1965
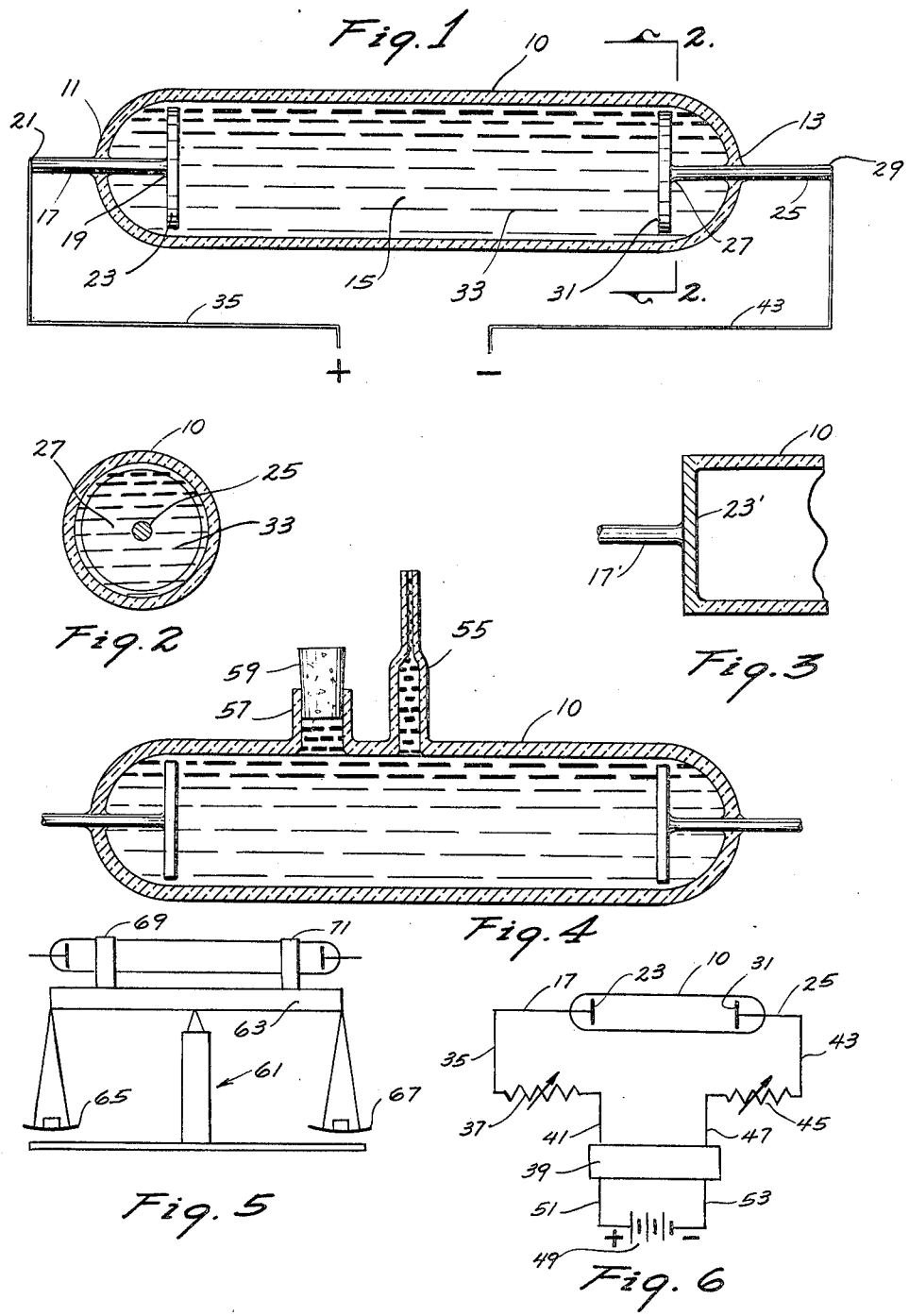
INVENTOR
JOHN R. BERRYHILL
BY Duck, Zarley, McKee & Thomte
ATTORNEYS

United States Patent Office 3,481,838
Patented Dec. 2, 1969

3,481,838
METHOD OF WEIGHING
John R. Berryhill, Madison, Wis., assignor to Dale Electronics Inc., Columbus, Nebr., a corporation of Nebraska
Filed Dec. 9, 1965, Ser. No. 512,687
Int. Cl. B01k 3/00
U.S. Cl. 204—1                                   1 Claim

ABSTRACT OF THE DISCLOSURE

An analytical balance having an elongated hollow tube operatively secured to the balance beam thereof and being centered thereon. The tube contains an electrolytic liquid and has spaced apart electrodes provided therein. A predetermined quantity of an electroplatable material is on at least one of the electrodes and the electrodes are electrically connected to a source of electrical energy adapted to cause the transfer of the material from one electrode to the other electrode.

---

An analytical balance is a common and useful laboratory instrument which is utilized to measure the weights of objects with errors of less than 1/10 milligram. The analytical balance is operated by first placing an object of unknown weight on one of the pans of the balance and then placing calibrated weights on the other pan of the balance until approximate equilibrium within 5 milligrams is obtained. Final balance is achieved by moving a small weight or rider along the calibrated beam of the balance. Even the most skilled operator finds it necessary to move the rider many times to attain the final balance. Each time the rider is moved, the operator must wait until the indicator needle comes to a substantial rest. The process of adjusting the rider is awkward and time consuming and depends on the manipulative skill and dexterity of the operator.

Therefore, it is a principal object of this invention to provide an improved analytical balance.

A further object of this invention is to provide an improved analytical balance which eliminates the need for a rider means thereon.

A further object of this invention is to provide an improved analytical balance wherein the final balance thereof is achieved by an electrochemical means.

A further object of this invention is to provide an improved analytical balance which can also be utilized to determine capacitance.

A further object of this invention is to provide an improved analytical balance which can also be utilized to analyze the output of an analog computer or other data source.

A further object of this invention is to provide an improved analytical balance which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claim, and illustrated in the accompanying drawings in which:

FIG. 1 is a longitudinal section of the electrochemical apparatus portion of the device;

FIG. 2 is a sectional view as would be seen on line 2—2 of FIG. 1;

FIG. 3 is a partial sectional view illustrating a modified end construction of the electrochemical apparatus portion of the device;

FIG. 4 is a longitudinal section of a modification of the electrochemical apparatus portion of the device;

FIG. 5 is a schematic view of the device; and

FIG. 6 is a wiring diagram of the device.

In FIGS. 1 and 2, the reference numeral 10 generally indicates a sealed electrically insulated tube having opposite ends 11 and 13 and a sealed interior compartment 15. Tube 10 is comprised of any suitable insulating material such as glass or the like.

A terminal 17 is sealably mounted in end 11 of tube 10 and includes inner and outer ends 19 and 21, respectively. The longitudinal axis of terminal 17 is parallel to the longitudinal axis of tube 10 as best illustrated in FIG. 1. A flat electrode 23 comprised of an inert metal such as platinum or the like is operatively secured by any convenient means at the center of its length to the inner end of terminal 17.

A terminal 25 is sealably mounted in end 13 of tube 10 and includes inner and outer ends 27 and 29 respectively. The longitudinal axis of terminal 25 is parallel to the longitudinal axis of tube 10 as best illustrated in FIG. 1. A flat electrode 31 comprised of an inert metal such as platinum or the like is operatively secured by any convenient means at the center of its length to the inner end of terminal 25. Electrodes 23 and 31 are transversely disposed with respect to the longitudinal axis of tube 10 as illustrated in FIG. 1. Tube 10 is filled with an electrolytic liquid 33 comprised of a solution of a salt of a readily electroplatable metal such as copper or the like. It is imperative that liquid 33 be of a uniform density throughout and that electrodes 23 and 31 be accurately flat and planar with respect to each other. As illustrated in FIG. 6, the outer end of terminal 17 is operatively connected to a wire 35 which extends therefrom to voltage regulator 37. Voltage regulator 37 is electrically connected to a switch 39 by means of wire 41. A wire 43 is electrically connected to the outer end of terminal 25 and extends to voltage regulator 45. Voltage regulator 45 is electrically connected to switch 39 by means of a wire 47. Switch 39 is electrically connected to a source of direct current 49 by means of wires 51 and 53.

FIG. 3 illustrates a modified end construction of tube 10 wherein the electrode 23' comprises the end wall of the tube and is sealed thereto by any convenient means. In this embodiment, terminal 17' is secured to and extends outwardly from electrode 23. The other end of tube 10 would be constructed identically to that illustrated in FIG. 3.

With respect to FIG. 4, a further embodiment is shown therein which is identical to that structure illustrated in FIG. 1 except that a capillary standpipe 55 has been provided on tube 10 and a fill tube 57 has also been provided on tube 10. Tube 57 is adapted to receive a stopper 59 therein.

In FIG. 5, the numeral 61 generally designates a conventional analytical balance including a balance beam 63 having weighing pans 65 and 67 operatively secured to the opposite ends thereof. Tube 10 is secured to balance beam 63 by any convenient means such as by brackets 69 and 71. Brackets 69 and 71 rigidly secure tube 10 to balance beam 63 for movement therewith. It is necessary that tube 10 be precisely positioned on balance beam 63 so as not to affect the balance of the analytical balance.

The normal method of operation is as follows. A precise known quantity of copper or the like is initially deposited on one of the electrodes in tube 10. For purposes of description let us assume that 5 mg. of copper is initially deposited on electrode 23. An object having an unknown weight is placed in pan 67. A quantity of known weights is placed in pan 65 until balance within 5 mg. has been achieved. Switch 39 is then activated to cause current to flow through tube 10 so that copper will be transferred from electrode 23 to electrode 31. The current is applied until balance is achieved. After balance has been achieved it is necessary to determine the amount of copper transferred to electrode 31. The mass of copper transferred from electrode 23 to electrode 31 is directly proportional to the product of the magnitude of the known current and the length of time of its application. The mass of copper transferred is calculated by utilizing the following formula:

$$M = \frac{IT}{FV} \times m$$

Where

M = mass of metal transferred (grams)
I = value of constant current (amperes)
t = total length of time of current application (sec.)
F = Faraday's constant (96,520 coulombs/mole)
m = mass of one mole of metal transferred (grams)
V = valence of effective metal ions EXAMPLE 1 (to determine the mass of metal transferred)

Assuming that .01 ampere of current was applied for 10 seconds to transfer M amount of copper as $Cu^{++}$ ions (V=2).

$$M = \frac{.01 \times 10}{96,500 \times 2} \times 63.5 = \frac{6.35}{1.93 \times 10^5}$$

$$= 3.29 \times 10^{-5} \text{ gm.}$$

$$= 0.0329 \text{ mg. of copper transferred}$$

Assume that the operator had placed an unknown weight on pan 67 and 5 mg. of metal had been previously deposited on electrode 31 and that the operator had achieved balance within 5 mg. by placing 13 mg. of known weights on pan 65. Assume further that the operator calculated (by means of the previous formula) that 2 mg. of metal was transferred to electrode 23 to achieve balance. The weight of the object in pan 67 would be determined to be 12 mg. The calculation of this weight is described in Example 2 below.

EXAMPLE 2
Initially

Wt. of metal on electrode 23 _____ 0
Known wt. on pan 65 _____ 13
Wt. of metal on electrode 31 mg. _____ 5
Unknown wt. on pan 67 _____ X Then, 2 mg. of metal transferred from electrode 31 to electrode 23 to achieve balance (computed by formula)

Mg.
Wt. of metal on electrode 23 _____ 2
Known wt. on pan 65 _____ 13

Total _____ 15

Wt. of metal on electrode 31 _____ 3
Unknown wt. on pan 67 _____ X

3+X

15=3+X

X=12 mg.

Assume that the operator had placed an unknown weight on pan 67 and 5 mg. of metal had been previously deposited on electrode 23 and that the operator had achieved balance within 5 mg. by placing 11 mg. of known weights on pan 65. Assume further that the operator calculated (by means of the previous formula) that 2 mg. of metal was transferred to electrode 31 to achieve balance. The weight of the object in pan 67 would be determined to be 12 mg. The calculation of this weight is described in Example 3 below.

EXAMPLE 3
Initially

Mg.
Wt. of metal on electrode 23 _____ 5
Known wt. on pan 65 _____ 11
Wt. of metal on electrode 31 _____ 0
Unknown wt. on pan 67 _____ X Then, 2 mg. of metal transferred from electrode 23 to electrode 31 to achieve balance (computed by formula)

Mg.
Wt. of metal on electrode 23 _____ 3
Known wt. on pan 65 _____ 11

Total _____ 14

Wt. of metal on electrode 31 _____ 2
Unknown wt. on pan 67 _____ X

Total _____ 2+X

14=2+X

X=12 mg.

From the foregoing it can be seen that a rapid means has been provided to determine the unknown weight of an object with an error of less than 1/10 milligram. In practice, the operator would utilize switch 39 to cause the metal to be transferred from electrode 23 to electrode 31 and vice versa by reversing the flow of current through tube 10. It may also be desirable to provide a calibrated clock means in the circuitry of the invention which would run only while current is being applied to accurately determine the length of time the current was applied. Alternatively, current could be supplied in measured pulses with the pulses being counted. In the pulse method, it would be desirable to connect a capacitor in parallel with the electrodes of the tube.

In an alternate application of the device, the balance could be brought into equilibrium by purely mechanical means and an unknown current could be subsequently applied to the electrodes of the tube. The resultant shift in weight would be a measure of the current integrated in time, or total charge, flowing in the circuit. This method would have application in reading capacitance or in analyzing the output of an analog computer or other data source.

It is essential to the correct operation of the device that no air be present within tube 10. With this factor in mind the embodiment of FIG. 4 has been illustrated. The capillary standpipe 55 and fill tube 57 not only simplify the sealing of tube 10 in order to exclude air therefrom but also serve to eliminate pressures caused by thermal expansion or contraction of the liquid 33.

It may also be desirable to connect the external power source to the electrodes in such a manner so that the electrodes would only be energized when the balance beam was immobilized. This could be accomplished by providing an intermittent contact means or the like.

Perhaps the most valuable application of the device is in situations where a series of supposedly uniform objects having substantially the same weight is to be weighed. In this situation, the balancing procedure could be made automatic by a system including the subject matter of this invention.

Thus from the foregoing it can be seen that the device accomplishes at least all of its stated objectives.

Some changes may be made in the construction and arrangement of my approved analytical balance without departing from the real spirit and purpose of my invention, and it is my intention to cover by my claim, any modified forms of structure or use of mechanical equivalents which may be reasonably included within their scope.

I claim:
1. The method of determining the weight of an object by means of an analytical balance including an elongated balance beam having an elongated hollow tube operatively secured thereto; said balance beam having first and second weighing pans operatively secured to opposite ends thereof respectively; said tube including spaced apart first and second electrodes operatively connected to a source of electrical energy, said tube containing an electrolytic liquid, and a predetermined quantity of electroplatable material on at least one of said electrodes, comprising the following steps, placing the object to be weighed in one of said weighing pans, placing a quantity of known weights in the other weighing pan until approximate balance is achieved, supplying an electrical current of known value to said first and second electrodes to cause the electroplatable material to be transferred from one electrode to the other electrode until balance is achieved, recording the length of time said current was supplied to said electrodes, calculating the weight of material transferred from one electrode to the other electrode, and calculating the weight of the object being weighed.

References Cited

UNITED STATES PATENTS

| | | | |
|---|---|---|---|
| 240,678 | 4/1881 | Edison | 177—46 |
| 282,428 | 7/1883 | Weston | 324—94 |
| 476,990 | 6/1892 | Edison | 324—94 |
| 925,064 | 6/1909 | Whitney | 324—94 |
| 2,890,414 | 6/1959 | Snavely | 204—195 |
| 2,945,398 | 7/1960 | Mullarkey | 324—94 |
| 3,119,754 | 1/1964 | Blumenfeld et al. | 204—195 |

OTHER REFERENCES

Fisher Bulletin FS–207, page 3, 1958.

JOHN H. MACK, Primary Examiner

T. TUNG, Assistant Examiner

U.S. Cl. X.R.

177—1, 246; 204—195; 324—29, 94